UNITED STATES PATENT OFFICE.

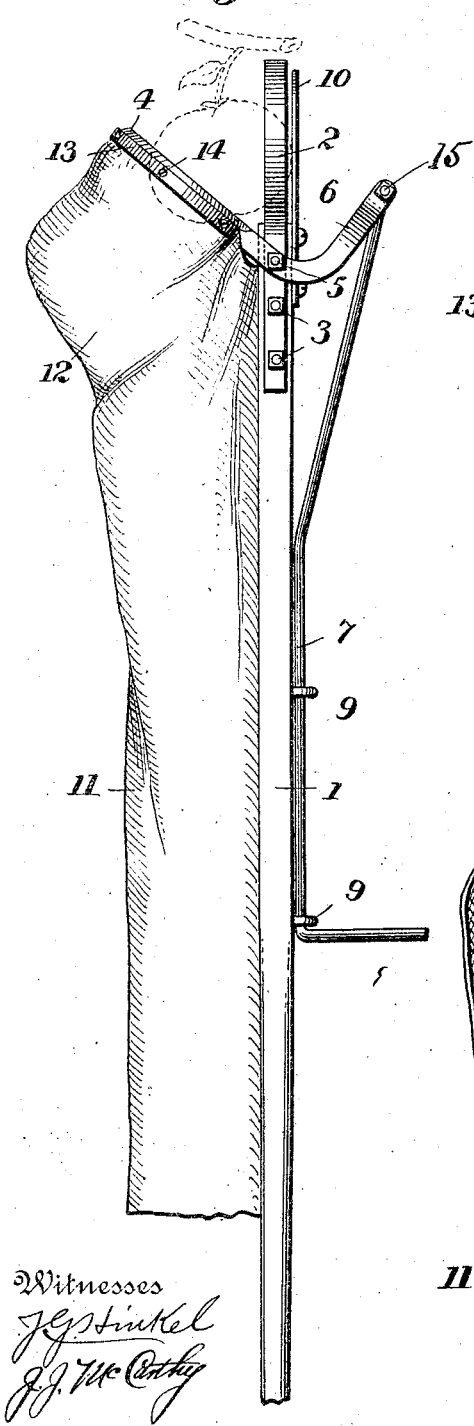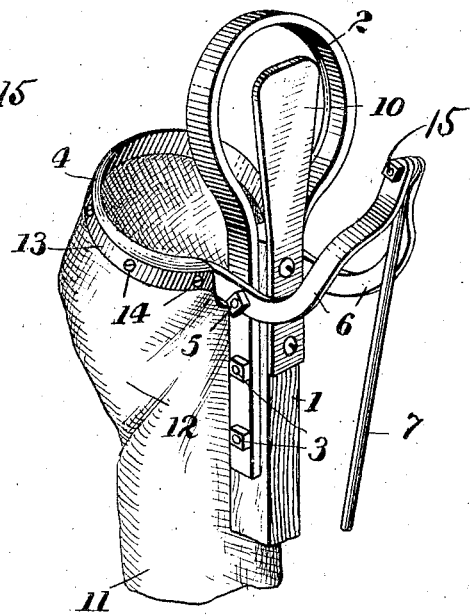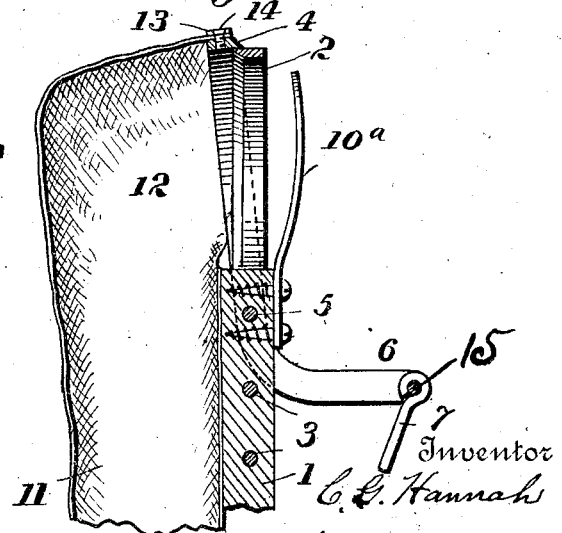

CICERO G. HANNAH, OF ATLANTA, GEORGIA.

FRUIT-GATHERER.

937,797.

Specification of Letters Patent.

Patented Oct. 26, 1909.

Application filed July 14, 1908. Serial No. 443,519.

*To all whom it may concern:*

Be it known that I, CICERO G. HANNAH, a citizen of the United States, residing at Atlanta, in the county of Fulton and State of Georgia, have invented certain new and useful Improvements in Fruit-Gatherers, of which the following is a specification.

This invention comprises improvements in devices for picking fruit such as oranges, lemons and apples from the parts of trees which are not readily accessible and transporting the fruit safely into a suitable receptacle. The device may also be used for pruning smaller branches of trees although it is particularly designed as a fruit picker.

The invention will be described in connection with the accompanying drawing, in which, Figure 1 is a side view of an implement embodying my invention; Fig. 2 is a perspective view of the upper part of the same; Fig. 3 is a sectional view showing the knives closed, the knives in Figs. 1 and 2 being shown open.

Referring to the drawing, 1 indicates a pole which may be of any desired length. For certain purposes a long pole will be used while for other purposes a pole of medium or short length only may be necessary. Rigidly connected with the upper end of the pole is a bowed knife 2 in the form of a loop, the ends of which are preferably fastened to opposite sides of the pole by means of bolts or screws 3. A second bowed knife 4 having a cutting edge of similar outline is pivotally mounted on the pole, being free to swing upon a bolt or pivot pin 5. The ends of the knife 4 extend beyond the pivot 5 in the form of arms 6 and the outer ends of these arms are pivotally connected by the pin 15 with an operating rod 7 which extends down the pole for a suitable distance and is provided with a handle 8. The rod passes through guides 9 connected with the pole and the handle 8 is preferably formed by bending the rod at right angles. This rod is sufficiently rigid to throw the movable knife back by an upward movement of the handle and I am therefore enabled to dispense with springs or other devices for moving this knife to this open position. Referring to Fig. 3 it will be noted that when the knives are in engagement and while performing the cutting operation the efficiency of the lever arm, which is the line drawn from the pivot pin 5 perpendicular to the rod 7, is the greatest since the line connecting the pins 5 and 15 is then at right angles to the rod 7. This is an advantageous arrangement whereby the greatest leverage is obtained at the time when the knives are performing the cutting operation. A plate 10 is rigidly connected to the pole and extends beyond the same, its upper part being opposite the opening of the fixed knife 2. As shown in Figs. 1 and 2, this plate is straight but in Fig. 3 I have shown a concave plate 10ª which is preferable when picking large fruit.

Connected with the movable knife 4 is a flexible tube 11 the upper end of which is secured in any suitable manner to the knife. This tube extends down the pole and is preferably connected thereto at intervals in any suitable manner, although it may be free from the pole if desired. The upper end of the tube is enlarged as at 12 to permit the knife to close without materially contracting the area of the tube. The tube may be made of canvas or any other suitable material. As shown it is connected to the movable knife 4 by means of a clamping strip 13 and screws 14.

In operating the knives are opened, as shown in Figs. 1 and 2, and placed in position to cut the stem of the fruit or the branch carrying the fruit, as shown in Fig. 1. The knives are then brought together into the position shown in Fig. 3, which cuts the twig or the stem and the plate or pusher 10 pushes the fruit into the tube 11. The plate or pusher 10 may be of various forms to suit different kinds of fruit. For large fruit it should be concave more or less, as shown in Fig. 3, while for a smaller fruit it may be straight and of larger area to prevent the fruit from passing out through the opening between the fixed knife 2 and the plate.

It will be evident that minor changes in construction may be made without departing from the spirit and scope of my invention. For instance the cutting portions of the knives may be circular, as shown, or oval or even rectangular but for most purposes the circular knives shown are preferred. In all cases of course, the cutting edges of the knives should be of the same outline so that they will coöperate with each other to cut the stem of the fruit properly.

My invention is very simple and cheap in construction and it has been demonstrated to be of great practical value for the purpose specified.

Having described the invention what I claim and desire to be secured by Letters-Patent is, 1. In a fruit picker, the combination with a pole, of a fixed knife comprising a band bent to form a loop and rigidly connected to the pole, a fixed pusher plate connected to the pole and extending to a position opposite the opening in the fixed knife and rearwardly thereof, a movable loop-shaped knife of suitable outline pivotally connected with the pole, said knives having coöperating cutting edges, and a flexible tube having its upper end connected to and movable with said movable knife.

2. In a fruit picker, the combination with a pole, of a fixed knife comprising a band bent to form a loop and rigidly connected to the pole, a fixed pusher plate connected with the pole and extending to a position opposite the opening in said fixed knife and rearwardly thereof, a movable loop-shaped knife having its branches pivotally connected with the pole on opposite sides thereof and extending laterally to form arms, said knives having coöperating cutting edges, an operating rod extending along said pole and connected with said arms at one end and provided with a handle at the opposite end, and a flexible tube having its upper end secured to the movable knife.

In testimony whereof I affix my signature in presence of two witnesses.

CICERO G. HANNAH.

Witnesses:
  ARTHUR L. BRYANT,
  JOHN M. COIT.